F. S. MILLER.
LUBRICATOR.
APPLICATION FILED FEB. 13, 1909.

932,045.

Patented Aug. 24, 1909.

Witnesses
Oliver W. Holmes
N. C. Healy

Inventor
Frank S. Miller
James J. Healy
By
Attorney

UNITED STATES PATENT OFFICE.

FRANK S. MILLER, OF CRESTON, IOWA.

LUBRICATOR.

932,045.　　　Specification of Letters Patent.　　Patented Aug. 24, 1909.

Application filed February 13, 1909. Serial No. 477,628.

*To all whom it may concern:*

Be it known that I, FRANK S. MILLER, citizen of the United States, residing at Creston, in the county of Union and State of Iowa, have invented new and useful Improvements in Lubricators, of which the following is a specification.

My invention pertains to lubricators, and it has for its object to provide a simple, compact and strong device, designed more especially for supplying grease to the crank-pins in locomotive driving rods, and constructed with a view of preventing loosening and casual displacement and loss of any of its parts when a locomotive is running at a high speed.

Figure 1:
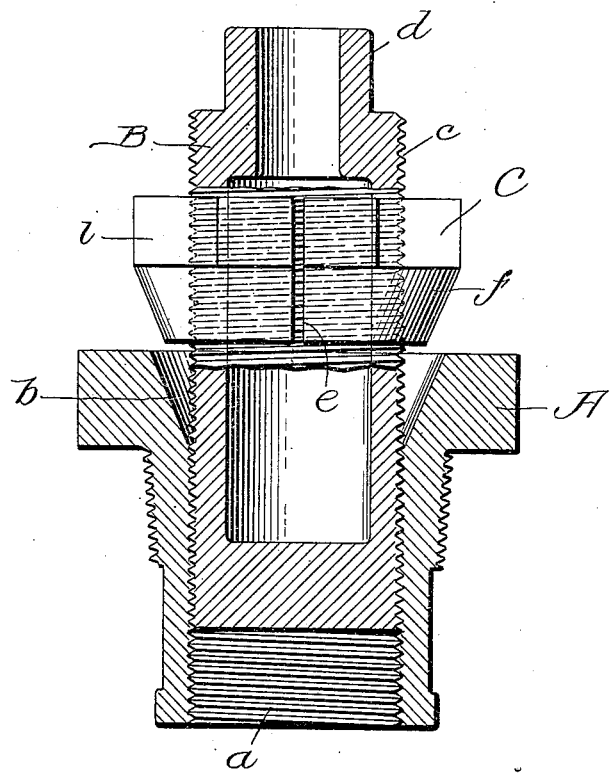
Figure 2:
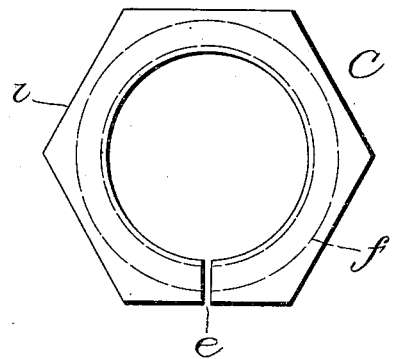

With the foregoing in mind the invention will be fully understood from the following description and claim when the same are read in connection with the drawings, accompanying and forming part of this specification, in which:

Figure 1 is a view, partly in section and partly in elevation, of the lubricator constituting the best practical embodiment of my invention of which I am cognizant. Fig. 2 is a plan view of the nut comprised in my improved device.

Similar letters designate corresponding parts in both views of the drawings, referring to which:

A is the casing or grease-cup of my novel lubricator. The said casing or grease-cup is equipped with a head and an exterior thread to adapt it to be connected with facility to the part to be lubricated and it is provided with an interior thread $a$. This latter extends from the lower end of the casing to a point adjacent the upper end thereof, and there the casing is provided with a downwardly tapered, smooth-bore socket $b$, arranged in the same horizontal plane as the head, and designed for an important purpose to be hereinafter set forth.

In addition to the casing A, the device comprises a hollow follower or plug B, exteriorly threaded at $c$ to engage the interior thread $a$, and having an upper end $d$ shaped or otherwise adapted for the application of a wrench or other implement (not shown), employed in turning the follower downwardly or upwardly, and a nut C arranged on and engaged with the thread $c$ of the follower. The said nut C is split at $e$ and is provided with a lower tapered portion $f$ complementary to the socket $b$, and an upper portion $i$ adapted for the application of a wrench, spanner or other implement employed to turn and adjust the nut on the follower B. In the present and preferred embodiment of my invention the said upper portion $i$ of the nut is hexagonal in outline, but it may obviously be of any other shape or construction compatible with the purpose of my invention without involving departure from the scope of the same as claimed.

In the practical use of my lubricator, the follower B is employed to force grease down in the casing A and on the part to be lubricated, and when the nut C is crowded down into the tapered socket $b$, it will be readily understood that the nut will be clamped against the thread of the plug, and will fix the said plug or follower with respect to the casing A, with the result that there is no liability of the plug or follower working loose and being lost during running of the locomotive at a high speed or any other speed. When it is desired to remove the follower in order to replenish the supply of grease in the casing A, or for any other purpose, the same may obviously be accomplished with facility after the nut C is turned out of the tapered socket in the casing A, as shown in Fig. 1.

The hollow follower B contributes materially to the lightness of the lubricator, and the casing A by receiving both the follower and the nut adds to both the compactness and the strength of the lubricator, the latter being due in large measure to the arrangement of the head on the casing in the same horizontal plane as the tapered socket in the casing. It will also be noted that the arrangement of the nut within the casing is advantageous because it renders it feasible to have the lubricator extend but a slight distance beyond the device by which the lubricator is carried.

Having described my invention, what I claim and desire to secure by Letters-Patent, is:

The herein described lubricator consisting essentially of a casing adapted to contain lubricant and having an interior thread in its lower portion and a downwardly-tapered, smooth-bore socket immediately above said interior thread, and also having a head arranged in the same horizontal plane as the tapered socket, and an exterior thread disposed below the head, an exteriorly threaded and hollow follower, of even diameter throughout its threaded portion, movable up and down in the threaded casing and having its upper end shaped for the application of a wrench, and a split clamping nut mounted on the follower and having a tapered lower portion adapted to enter the socket of the casing and rest in the same horizontal plane as said socket and the casing head.

In testimony whereof I have hereunto set my hand in presence of two subscribing witnesses.

FRANK S. MILLER.

Witnesses:
H. C. SMITH,
IRA G. MORRISON.